United States Patent [19]

McCutchen

[11] 4,256,280
[45] Mar. 17, 1981

[54] CONSOLE SUPPORT BRACKET

[76] Inventor: James E. McCutchen, 37 S. Del Norte Rd., Greenville, S.C. 29607

[21] Appl. No.: 939,480

[22] Filed: Sep. 5, 1978

[51] Int. Cl.³ .............................................. F16M 13/00
[52] U.S. Cl. .................................................. 248/220.2
[58] Field of Search .................... 248/73, 220.2, 222.4, 248/225.1, 243, 466, 475, 551, 201; 312/245, 247

[56] References Cited

U.S. PATENT DOCUMENTS

| | | | |
|---|---|---|---|
| 1,790,977 | 2/1931 | DeBoer | 312/245 X |
| 1,835,042 | 12/1931 | Hammer et al. | 248/222.4 X |
| 3,410,122 | 11/1968 | Moses | 248/553 X |
| 3,469,711 | 9/1969 | Swaneck et al. | 248/243 |
| 4,024,737 | 5/1977 | McInturff | 70/58 |
| 4,031,721 | 6/1977 | Anderson | 70/58 |
| 4,061,971 | 12/1977 | Barrons | 248/346 X |
| 4,065,087 | 12/1977 | Solden | 248/201 |

FOREIGN PATENT DOCUMENTS 669697  9/1963  Canada ..................................... 248/243

Primary Examiner—William H. Schultz
Attorney, Agent, or Firm—Bailey, Dority & Flint

[57] ABSTRACT

A bracket for supporting a console upon which a citizens band radio or tape player is mounted in a vehicle which permits readily removal of and mounting of the console. The bracket includes a base plate which has a substantially flat base through which fastening devices extend for securing the base plate to the vehicle. Opposed spaced elongated flanges extend outwardly at right angles to the base and spaced L-shaped slots are provided in the flanges with the slots in one flange being directly opposite the slots in the other flange. Outwardly extending studs are carried on the console. Each stud has an enlarged head on a remote end thereof and a reduced diameter intermediate portion. The studs are positioned on the console so as to be in alignment with the L-shaped slots of the base member whereby the console can be readily mounted on the base plate by inserting the studs into the L-shaped slots.

2 Claims, 3 Drawing Figures

CONSOLE SUPPORT BRACKET

BACKGROUND OF THE INVENTION

With increased popularity of citizen band radios and tape players being utilized in vehicles such as tractor-trailers and automobiles, the theft of such instruments has become common. In order to avoid this, various locking brackets have been utilized with the citizen band radios and the like which require a key to open the lock to permit removal of the instrument. Examples of various brackets are illustrated in U.S. Pat. Nos. 4,024,737 and 4,031,721.

Another type of bracket for supporting a citizen band radio in a vehicle so as to make the radio readily accessible to the driver is disclosed in U.S. Pat. No. 4,061,971.

One problem with the devices disclosed in the above patents is that they cannot be readily removed by the owner and oftentimes the equipment will be damaged by a thief attempting to remove the instrument.

SUMMARY OF THE INVENTION

The invention includes a bracket for supporting a console upon which a citizen band radio is mounted in a vehicle which permits readily removal of and mounting of said console. The bracket includes a base plate which has a substantially flat base that is secured to the vehicle by fastening devices. The base may be fastened to the vehicle to support the citizen band radio in either a horizontal, vertical or inclined position. Opposed spaced elongated flanges extend outwardly at right angles to the base. Spaced L-shaped slots are provided in the flanges with the slots in one flange being directly opposite the slots in the other flange. The citizen band radio is mounted on a console in any suitable manner such as by means of bolts. Positioned on the bottom of the console are studs which have enlarged heads. These studs are positioned to be in alignment with the L-shaped slots of the base member so that the console can be readily mounted on and removed from the base plate by merely inserting the studs in the L-shaped slots.

Accordingly, it is an object of the present invention to provide a bracket which premits readily mounting and removal of a console which supports a citizen band radio or the like in a vehicle.

Still another important object of the present invention is to provide a bracket that can readily support a console on which a citizen band radio or the like can be positioned in various positions.

These and other objects and advantages of the invention will become apparent upon reference to the following specification, attendant claims and drawing.

DESCRIPTION OF A PREFERRED EMBODIMENT

Figure 1:
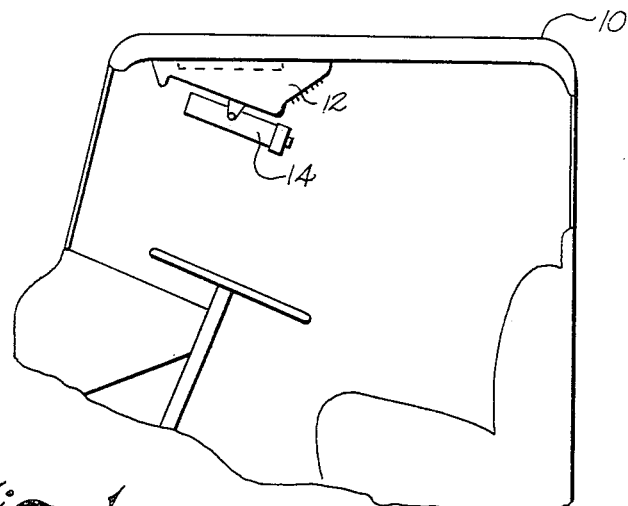
FIG. 1 is a side elevational view showing the console mounted on the ceiling of a truck.

Referring to FIG. 1 of the drawing, there is illustrated a cab 10 of a truck that is usually used for pulling trailers and often referred to as a tractor-trailer. Positioned on the roof of the cab is a console 12 that has mounted thereon a citizen band radio 14. While throughout the specification reference will be made to citizen band radios, it is to be understood, of course, that the console 12 could also be used for supporting tape players and the like.

The citizen band radio 14 is mounted to an inclined surface 16 of the console by means of a bracket 18 which has bolts 20 extending therefrom. The bolts 20 extend through slots 22 provided in the face of the console. Nuts 24 are screwed on the bolts 20 for securing the citizen band radio. The console 14 may have a speaker 25 mounted therein and a grid 26 provided on the face thereof through which the sound projects. Wires 28 extend from the citizen band radio to the speaker. Normally, the citizen band radio and the console form a unitary unit and when it is desired to remove the citizen band radio from the vehicle, the entire console and citizen band radio are removed together.

The bracket includes a substantially flat base plate 30 which has opposed spaced elongated flanges 32 extending at right angles therefrom. Spaced L-shaped slots 34 are provided in the flanges.

The base plate 30 is normally permanently fastened to the vehicle such as the roof as illustrated in FIG. 1 by means of screws 36 which extend through prepunched tabs 38 provided in the base plate 30. As a result of the tabs being prepunched, they can be bent to conform to the surface of the vehicle.

Positioned on the inner walls of the console are elongated metal strips 40 which have studs 42 projecting outwardly therefrom. These studs 42 have enlarged heads and reduced diameter intermediate portions. The studs are positioned along the strip so as to conform to the spacing between the L-shaped slots provided in the flanges of the base plate.

When it is desired to mount the console on the base plate, the studsare merely aligned with elongated slots 34 and the reduced diameter portion thereof is inserted down and into the slots for securing the console on the base plate.

Figure 2:
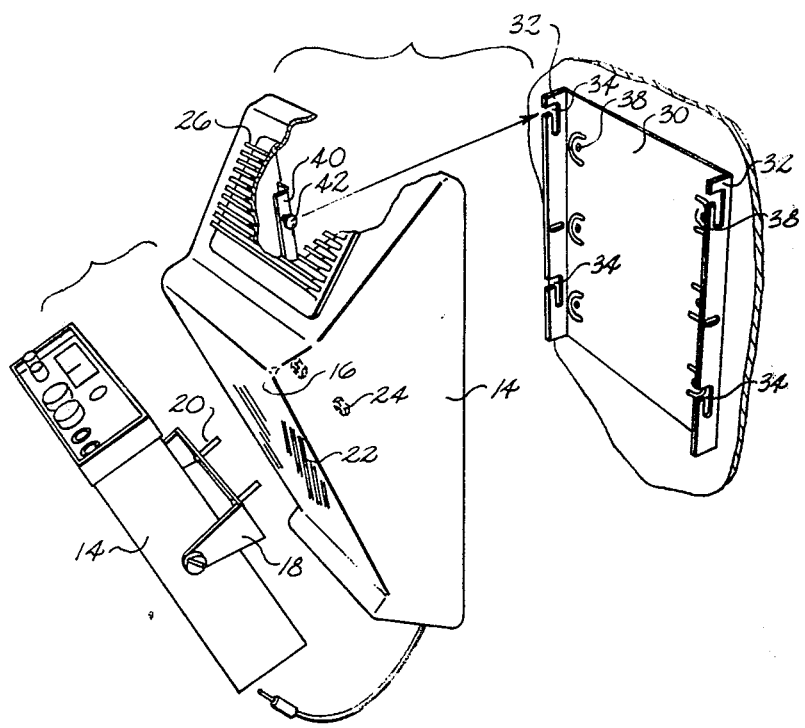
FIG. 2 is an exploded view with parts cut away illustrating a bracket that is used for supporting a console and radio.
Figure 3:
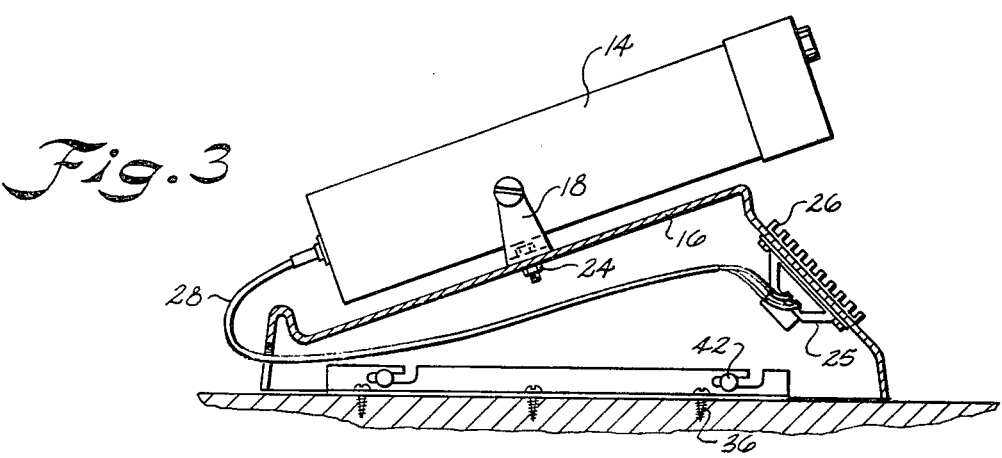
FIG. 3 is a side elevational view showing the bracket securely holding a console in position.

As illustrated in FIG. 3, the base plate is mounted on a horizontal surface. In FIG. 2, the base plate is mounted on a vertical surface.

In order to remove the citizen band and console from the vehicle, he merely slides the studs upwardly in the slots 34 and out of the open end thereof.

While a preferred embodiment of the invention has been described using specific terms, such description is for illustrative purposes only and it is to be understood that changes and variations may be made without departing from the spirit or scope of the following claims.

What is claimed is:

1. A bracket for supporting a console having spaced side walls upon which a radio or the like is mounted in a vehicle which permits readily removal of and mounting of said console, said bracket comprising:
   a base plate including,
      (i) a substantially flat base,
      (ii) fastening devices securing said base to said vehicle,
      (iii) opposed spaced elongated flanges extending outwardly at right angles to said base, and
      (iv) spaced L-shaped slots provided in said flanges with the slots in one flange being directly opposite the sots in said other flange,
   elongated strips carried by said spaced side walls of said console, laterally extending studs carried by said elongated strips, said studs having an enlarged head on the remote ends thereof and having a reduced diameter intermediate portion, said studs being positioned on said console to be in alignment with said L-shaped slots of said base member, whereby said console can be readily mounted on said base plate by inserting said studs into said L-shaped slots.

2. The bracket as set forth in claim 1 further comprising:

prepunched tabs carried on said base which can be readily bent for mating with a surface of said vehicle upon which said base plate is to be mounted, and said fastenting devices extending through said tabs for securing said base plate to said surface.

* * * * *